Feb. 22, 1955 E. G. REED 2,702,406
APPARATUS FOR STRETCHING SHEET MATERIAL
Filed Dec. 13, 1950 6 Sheets-Sheet 1

Inventor
Exa Glenn Reed
By Wallace and Cannon
Attys

Feb. 22, 1955  E. G. REED  2,702,406
APPARATUS FOR STRETCHING SHEET MATERIAL
Filed Dec. 13, 1950  6 Sheets-Sheet 5

Inventor
Exa Glenn Reed
By Wallace and Cannon
Attorneys

Feb. 22, 1955 E. G. REED 2,702,406
APPARATUS FOR STRETCHING SHEET MATERIAL
Filed Dec. 13, 1950 6 Sheets-Sheet 6

Inventor
Exa Glenn Reed
By Wallace and Cannon
Attorneys

United States Patent Office 2,702,406
Patented Feb. 22, 1955

2,702,406

APPARATUS FOR STRETCHING SHEET MATERIAL

Exa Glenn Reed, Akron, Ohio, assignor, by mesne assignments, to Energized Materials Corporation, Chicago, Ill., a corporation of Illinois Application December 13, 1950, Serial No. 200,671

6 Claims. (Cl. 18—1)

This application is a continuation-in-part of my application Serial No. 750,737, filed May 27, 1947.

This invention relates to a means for stretching sheet material and is more particularly concerned with the progressive and continuous stretching of a plastic film as, for example, thermo-plastic materials including metallic films, rubber hydrochloride films, polyvinyl chloride films, and the like, and my invention is further concerned with imparting new or different physical characteristics to the stretched material.

In the manufacture of plastic films or sheet materials of various types it is the usual practice to form the films from bulk materials by the use of a doctor bar or a calendering operation, and while comparatively thin films can so be reproduced which are acceptable for gift, fruit, vegetable or other wrapping and packaging, nonetheless the processes and apparatus for producing such films render it difficult to form films thinner than those now available. Furthermore, substantially all commercially available films are of such thickness that they are not susceptible of being readily woven, even if cut into narrow ribbons, and it is essential to provide a thinner film than that now available commercially to successfully weave flexible cloth, spirally wrapped wires or cords, and the like.

It has been proposed heretofore to stretch film material in a longitudinal direction, but materials stretched in this manner have a distinct longitudinal grain and fail to develop physical characteristics of the type hereinafter discussed.

Moreover, I have discovered that many plastic film materials of the type described are not only rendered thinner and more flexible when subjected to both lateral and longitudinal stretching, but the physical characteristics of the stretched film appear to be quite different from the physical characteristics of the unstretched films, or the films stretched in one direction only. The yield point of the material and the ultimate strength are both increased, the protective qualities of the film when used as a wrap for fruit, vegetables, and other perishable foods, is notably enhanced, and the stretched film possesses what is believed to be an electric energy characteristic. Additionally, the two-way stretch film is not only reduced in thickness but considerably increased in area so that it is possible to wrap or cover a great many more articles or surfaces than could have been done with the unstretched film.

It is the general object of my invention to avoid and overcome the foregoing and other difficulties of and objections to known practices by the provision of improved means for continuously and progressively stretching plastic films longitudinally and laterally to reduce the gauge or thickness of the films, and to change the physical characteristics thereof.

Another object of my invention is to afford a means capable of expeditious adjustment and of a controllable character whereby desired stretching of the film may be imparted thereto and the relation of the longitudinal to the lateral stretching can be adjusted and coordinated so as to enable the optimum or desired stretch to be effected.

Another object of my invention is to afford a relatively inexpensive, readily adjusted and operated apparatus for progressively and continuously imparting a longitudinal and lateral stretch to a plastic film and to afford a means which may be readily operated by the average workman.

Another object of my invention is to afford an improved means for progressively and continuously stretching film material wherein the film material passes through a varied stretching operation that is of such nature that the maximum stretch is imparted to the film only after a preliminary and conditioning stretching thereof.

Yet another object of my invention is to employ spaced apart pulleys or wheels arranged in diverging relation one with the other and to pass the film about a portion of the periphery of each of such wheels so as to thereby effect stretching of the film, and an object ancillary to the foregoing is to retain the edges of the film in engagement with such wheels during the time the stretching is to be effected, and an object ancillary to this is to impart two so-called V-belts respectively operative in grooves afforded in the peripheries of the wheels or pulleys whereby the edges of the film to be stretched may be clamped by an dge of such a groove and an adjacent portion of such a belt.

Yet other objects of this invention are to enable a film to be stretched to be heated either prior to the time it is subjected to a substantial stretching operation and/or while it is being subjected to a continuous and progressive stretching in both longitudinal and lateral directions; to so store a stretched film that return or a tendency thereof to return to its unstretched state will be overcome; to afford an arrangement whereon the stretched film may be stored to permit aging thereof to be effected and whereon the film will be maintained in a stretched condition; and to afford such adjustments as will enable compensation to be made for variations in films to be stretched.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
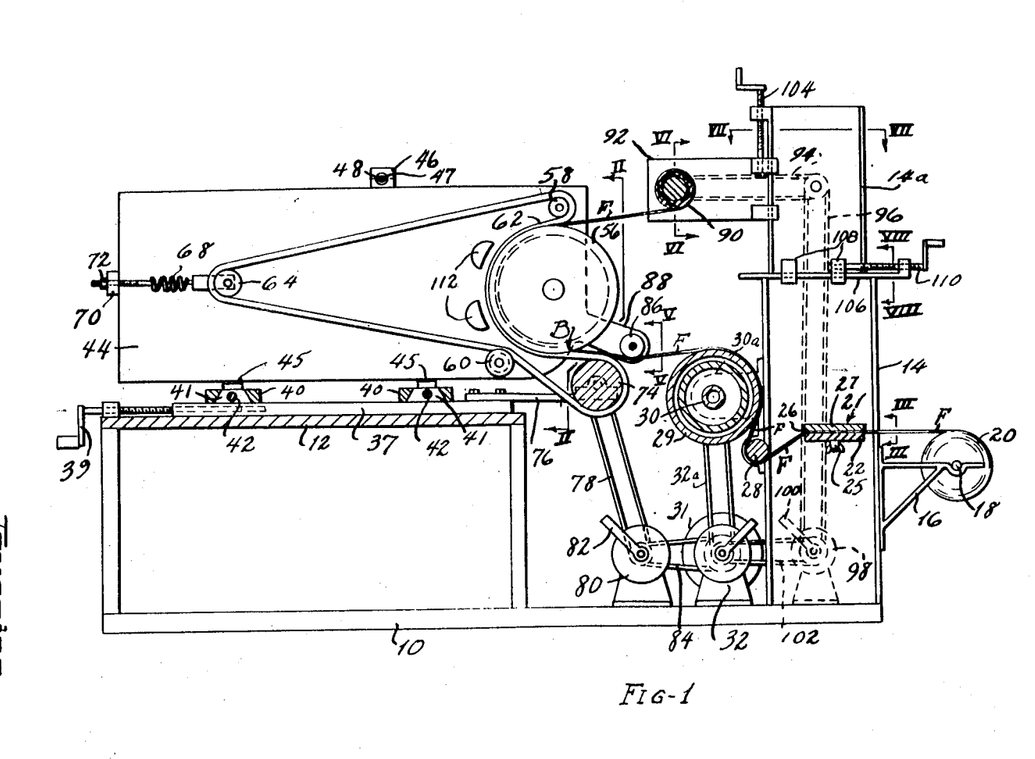
Fig. 1 is a longitudinal vertical section through one embodiment of my invention.
Figure 2:
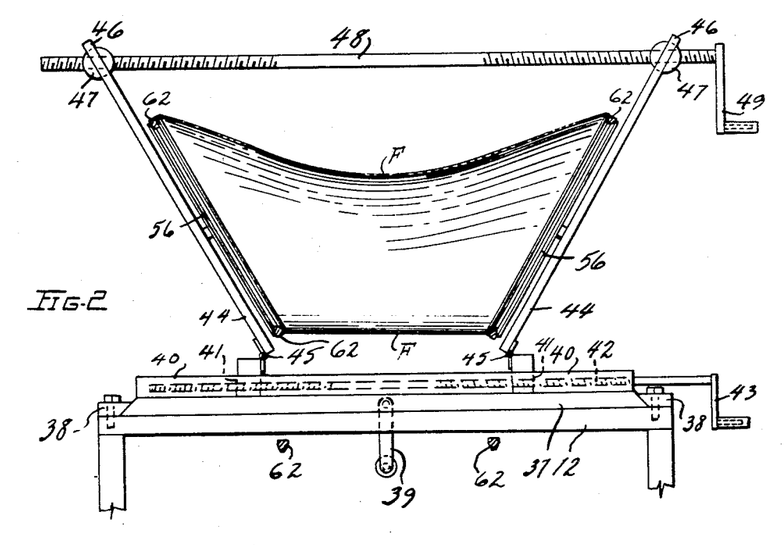
Fig. 2 is a transverse vertical sectional view taken substantially along the line II—II on Fig. 1.
Figure 3:
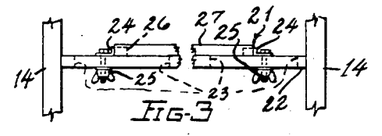
Fig. 3 is a fragmentary front elevation of a guiding and static removing means incorporated in the apparatus and which is taken substantially along the line III—III on Fig. 1.

In the form of the apparatus illustrated in Figs. 1 to 9 of the drawings, 10 indicates generally a bed provided with a table portion 12 and spaced uprights 14 at one end. The uprights 14 near their lower ends removably support on brackets 16 in a quickly releasable manner, a shaft 18 upon which a roll 20 of plastic film material F is adapted to be mounted. The film F extends from the roll 20 through a guide and static reducing mechanism 21 including a bottom beam member 22 which extends between the uprights 14. As best seen in Figs. 1 and 3, the beam is formed with slots 23 and angles 24 are secured in the slots by wing-nut bolts 25 substantially the width of the film being run. The angles 24 have right angle finger portions 26 at their back ends which hold a block of Masonite, plywood or a plurality of stacked pieces of cardboard, indicated by the numeral 27, in place on the beam, and with the film F passing between the beam and block to smooth the film and to reduce the static charge thereon.

Figure 4:
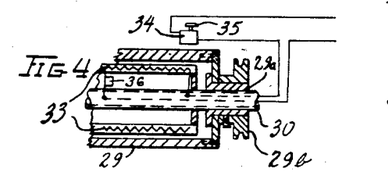
Fig. 4 is a partially diagrammatic vertical sectional view of the end of a heated roller employed in the apparatus.

From the mechanism 21 the film passes over a roll 28, which may be provided with an adjustable tension drag, and from there passes to a roller 29 having hubs 29ᵃ journaled on a hollow shaft 30 fixed in brackets 30ᵃ on the uprights 14. The roller 29 is driven from a constant speed motor 31, whose effective driving speed is changed by change-speed mechanism, such as a Reeves drive. A belt 32ᵃ extends from the change-speed mechanism 32 to a pulley 29ᵇ secured to the hub 29ᵃ. The roller 29 is provided with internal heating means of any desired character. One convenient and readily controlled manner of heating the roll is to use electric heating means 33, and, as best shown in Fig. 4, a thermostat 34 positioned closely adjacent the roller and having a temperature adjusting screw 35 and an internal thermostat 36 will control the supply of electric current to the coil means. Thus the roller 29 can be brought to and maintained at a desired temperature to heat and soften the film F in its passage over the roller. The stationary heating means 33 with the roll 29 passing continuously therearound insures uniform heat over the surface of the roll itself in better fashion than if the heating means were mounted to turn with the roll.

Positioned on the table 12 is a plate 37 having beveled edges slidably held by gibs 38 secured to the table so that the plate 37 can be moved to and from the roller 29 by turning a crank 39 journaled on the table and having a threaded shaft extending into a tapped hole in the plate 37.

Transversely mounted on the plate 37 are gibs 40 which slidably receive blocks 41, and a pair of screws 42 having right and left hand threads thereon (see Fig. 2) extend through appropriately tapped holes in the blocks so that when the screws 42 are turned by cranks 43 the blocks move toward or from each other. This adjusts the lateral stretching means to the width of the film being run.

A frame 44 is mounted on each longitudinally aligned pair of blocks, as by hinges 45, and the tops of the frames each have a block 46 secured thereto which pivotally supports a tapped ball 47 and a shaft 48, having opposed right and left hand threads, extends through the balls and is turned by a crank 49. In this manner the tilted relationship between the frames is adjusted.

The front of each frame journals a relatively large diameter pulley 56 which is adapted to receive a V-belt 62, and idlers 58 and 60 on the frame are so positioned in conjunction with the pulley 56 and drive roller 74, hereinafter described, as to hold the V-belt in engagement with the pulley groove over a relatively large arc of the pulley. The V-belt 62 is endless and extends over a take-up pulley 64, also on the frame, which is secured by a tension spring 68 to a block 70 fastened on the end of the frame. An adjusting nut 72 controls the tension applied to the spring 68, and thus to the belt 62.

The V-belts 62 are usually of rubber reinforced with fabric and cord in known manner, but the belts may also be made of metal links pivotally connected together, and this latter structure is advantageous in operating upon plastic films of metal, especially at elevated temperatures.

In order to simplify the showing in Fig. 1 of the drawing, the frames 44 and the associated apparatus carried thereon are shown in elevation. However, it will be understood that the frames 44, and thus the pulleys 56, are ordinarily operated with the frames and pulleys tilted outwardly and upwardly in diverging relation as in Fig. 2.

The V-belts 62 extend also over a drive roller 74 which is journaled on brackets 76 mounted on the plate 37, the roller 74 extending substantially the full width of the apparatus. Thus, the roller 74 will not tilt when the frames 44 are tilted, but there is enough flexibility in the V-belts to allow the tilting of the frames without interfering with the belt travel or the drive of the roll 74. It is to be noted that it is the back of the belts 62 which engage with the drive roller 74, but I have found that a satisfactory drive is obtained, and with a minimum of wear in this manner.

The roll 74 is driven by a belt 78 extending from a speed changer 80, having a change speed lever 82, in turn driven by a belt 84 from the motor 31. It will be recognized that the roll 74 and the frames 44 can be moved to and from the roller 29 to control the length of the longitudinal stretching zone for the film, and that positioning the lever 82 of the speed changer 80 will change the relative speeds of the belt 62 and the roll 29 to determine the amount of longitudinal stretch put into the film in the longitudinal stretching zone.

Figure 9:
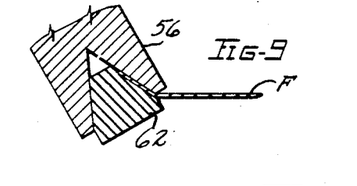
Fig. 9 is an enlarged fragmentary cross sectional view illustrating the manner in which the edge of the film is grasped during the continuous and progressive longitudinal and lateral stretching thereof.

Having reference now to Fig. 9 of the drawings, it will be evident that the film F is gripped between one pulley 56 and its associated V-belt 62 along the opposed side edges of the film in the manner shown in this figure of the drawings, during the normal operation of the apparatus, with the frames 44 and pulleys 56 being so positioned with relation to the width of the film F and the roller 74 so as to insure that the film edges are gripped as described. It will be understood that the film edges are gripped between the bight of the V-belt and its pulley 56 substantially at the point marked with B on Fig. 1 of the drawings.

Figure 5:
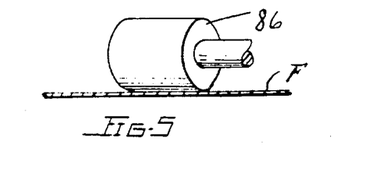
Fig. 5 is a fragmentary cross sectional view of an arrangement for guiding the edges of the film to be stretched and which is taken substantially along the line V—V on Fig. 1, and also which is drawn to an enlarged scale.

In the passage of the film from the roller 29 to the bight B, I have found it advantageous to employ small rollers or wheels 86 on the top edges of the film, these rollers being journaled with their axes tilted in a direction to tighten or slightly stretch the film laterally a short distance ahead of where it passes into the bight (see Fig. 5). The rollers are adjustably mounted on extensions 88 of the frames 44.

As the film F leaves the pulleys 56 it passes to a windup roll 90 journaled on plates 92 adjustably mounted on the uprights 14ᵃ. The windup is driven by belts 94 and 96 and through an adjustable speed changer 98 having a speed control handle 100 and back to the speed control 32 of the motor 31 by belt 102. It is necessary to periodically reposition the handle 100 from time to time as the diameter of the windup roll 90 builds up. The windup roll 90 may be crowned in the manner best seen in Fig. 6 of the drawings, to assist in centering and holding the film in its stretched condition. But most important, I usually make the roll 90 of a shorter length than the width of the stretched film so that the edges of the film fold over the end of the roll and are held snugly in stretched relation on the windup roll.

Figure 6:
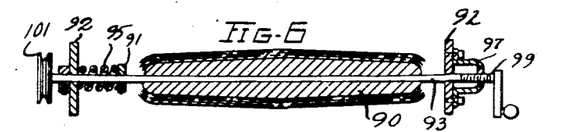
Fig. 6 is a view taken transversely of the machine and showing a cross section of the wind up roll and axle adjusting means therefor and which is taken substantially along the line VI—VI on Fig. 1.

To assist in aligning and centering the roll 90 in the plates 92, I provide a collar 91 on the shaft 93, and a compression spring 95 around the shaft and positioned between the plate 92 and the collar 91 tends to resiliently hold the roller 90 to the right in Fig. 6. A yoke 97 is secured to the other plate 92 and a crank 99 threaded into a tapped hole in the yoke engages the end of the shaft to move it axially and compress or relieve the spring 95. In this manner the roll 90 can be adjusted axially a few inches to insure, if necessary, alignment with the film F being wound thereon, all without objectionably disturbing the drive to a pulley 101 on the shaft 93.

Figure 7:
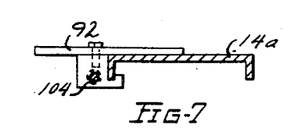
Fig. 7 is a horizontal sectional view of the mechanism for adjusting the vertical position of the wind up roll and which is taken along the line VII—VII on Fig. 1.

By slidably mounting the plates 92 on upper portions 14ᵃ of the uprights 14, as shown in Fig. 7, and controlling their vertical position with a crank and screw 104, I am able to control the angle that the stretched film leaves the pulleys 56.

Figure 8:
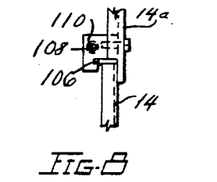
Fig. 8 is a vertical sectional view of the means for horizontally adjusting the windup roll and which is taken substantially on the line VII—VII on Fig. 1.

A further adjustment for the windup roll is shown in Figs. 1 and 8 and comprises means for moving the roll to and from the pulleys 56. This is achieved by welding a plate to the top of each upright 14 and then slidably mounting the upper portion 14ᵃ of the upright 14 by means of blocks 108 on the plate 106 and controlling the position of the upper portions 14ᵃ by means of a crank screw 110.

Infra-red ray radiant or hot air or other heating means may be associated with the apparatus, as indicated by the numeral 112, and in the region of the pulleys 56, and with certain films may be turned on to maintain the film at the desired temperature during the lateral stretching operation. Again, the entire apparatus can be enclosed and the enclosure heated, which is advantageous in operations upon metal films.

It is believed that the operation of the apparatus shown in Figs. 1 to 9, inclusive, will be evident from the foregoing description. However, briefly summarizing this operation, the film F passes from the roll 20 over the guiding and static relieving means 21 to the roller 29. The electrically heated roller 29 imparts a warming and softening to the film so that the film in traveling from the roller 29 to the pulleys 56 can be given a desired longitudinal stretch of adjustable length inasmuch as the pulleys 56 are driven with their associated V-belts 62 at a selected faster surface speed than the roller 29. The edges of the film F pass into the bight B where the edges of the film are gripped in the manner shown in Fig. 9. The outward and upward diverging relation of the pulleys 56 causes a selected, adjustable lateral stretch to be imparted to the film. It is to be noted here that the longitudinal and lateral stretch given the film is a simultaneous two-way stretch inasmuch as the longitudinal stretch imparted to the film adjacent the bight merges gradually into the lateral stretch imparted to the film in the same area, all as provided for by the elasticity of the material. On this point reference should be had to Fig. 2 of the drawings which illustrate the manner in which the film bows itself during its passage over the pulleys 56. Pigmented and colored materials clearly display iridescent, flowing characteristics in this region which visually emphasize the stretching of the film in all directions simultaneously.

As the film leaves the pulleys 56 and is wound up by the windup roller 90, an additional longitudinal stretch is ordinarily given to the film with the same merging of the longitudinal and lateral stretch, and the film is wound up in stretched condition on the windup roll. Adjusting the speed changer 32 will speed up or slow down the operation of the entire apparatus without changing the relationship between the parts. Also, it will be recognized that all of the adjustments heretofore described can be achieved within the limits required without interfering with the belt drives shown, and, as previously stated, all of the adjustments can be made during the continuous operation of the apparatus to obtain optimum operating conditions or to slack off and prevent breaking of the film under the control of the operator.

Figure 10:
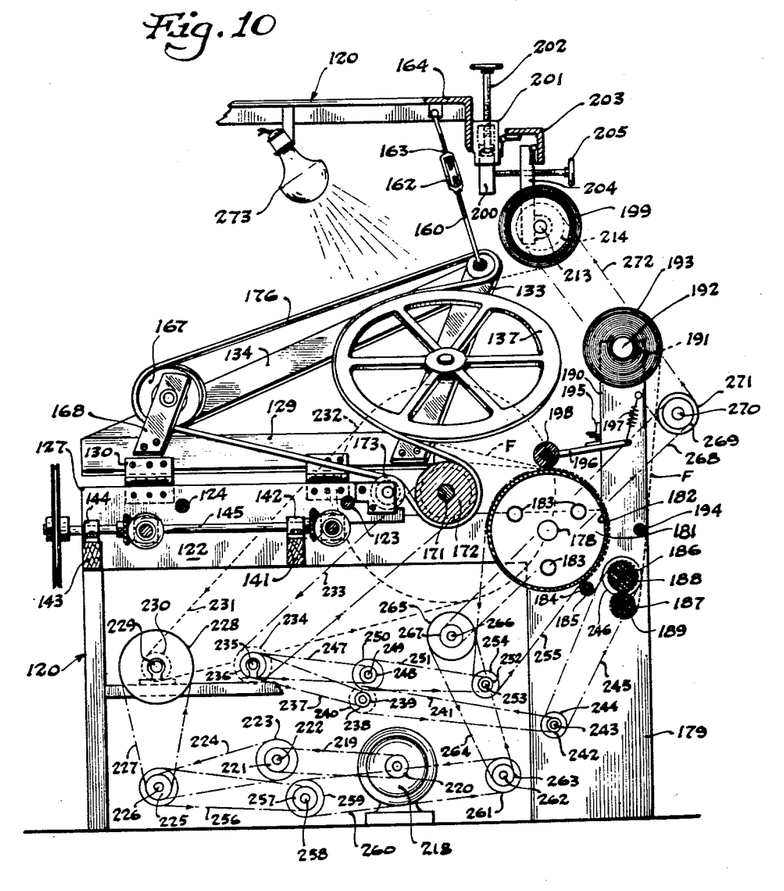
Fig. 10 is a longitudinal sectional view of another embodiment of my invention.
Figure 11:
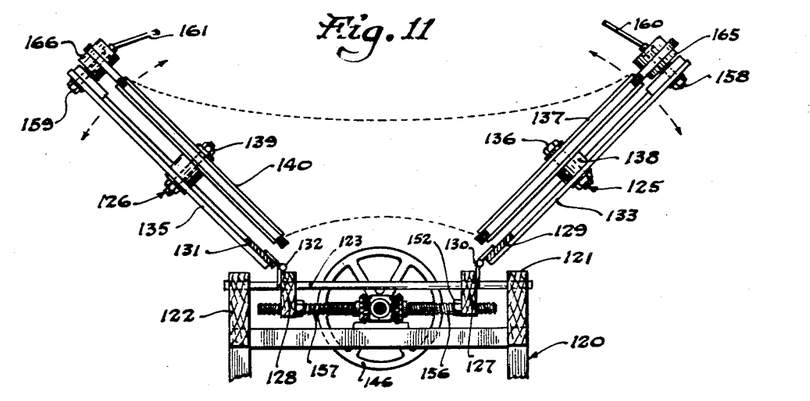
Fig. 11 is a transverse sectional view showing a portion of the apparatus illustrated in Fig. 10.
Figure 12:
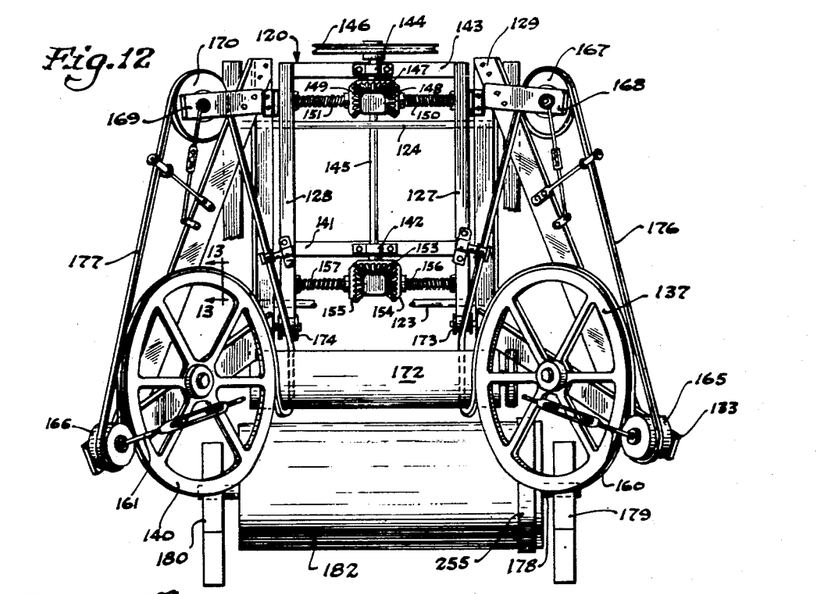
Fig. 12 is a plan view of the apparatus as illustrated in Fig. 10.

In the form of my invention illustrated in Figs. 10 to 21, inclusive, the machine embodies the frame generally indicated by 120 that includes rails 121 and 122 that are respectively disposed on opposite sides of the frame and along the upper edge thereof rods as 123 and 124 extend between the rails 121 and 122 in spaced relation one with the other. Rods 123 and 124 afford a support for carriage members generally indicated by 125 and 126. The carriage member 125 includes a plate 127 through which the rods 123 and 124 are extended, these rods also extending through a plate 128 on the carriage 126. Carriage 125 also includes another plate 129 which, as best shown in Figs. 10, 11 and 12, is hingedly connected to the plate 127 by hinges as 130. Similarly the carriage 126 includes a plate 131 which is connected through hinges as 132 to the plate 128.

A support arm 133 is secured to and extends upwardly from the plate 129, a brace 134 being connected to the free end of the arm 133 and the plate 129 to thereby assure rigid support of the arm 133. An arm 135 is provided on the carriage 126 and this arm 135 is similar to the arm 133 and is supported in the same manner as the arm 133. An opening is provided in the arm 133 approximately midway in the extent thereof and a shaft 136 is mounted in this opening. A pulley 137 is rotatably mounted on the shaft 136 and is held in spaced relation with the arm 133 by a spacing collar 138 disposed about the shaft 136 which has the ends thereof pinned or otherwise retained so as to thereby afford a rotatable support for the pulley 137. A shaft 139, similar to the shaft 136, is provided approximately midway in the extent of the arm 135 and affords a rotatable support for a pulley 140.

For the purpose described more fully hereinafter the carriages 125 and 126 are mounted for movement relative to each other. To this end a cross brace 141 is extended between the side plates 121 and 122 and affords a support for a bearing 142. Another cross brace 143 is extended between the side plates 121 and 122 and affords a support for a bearing 144. A shaft 145 is journaled in the bearings 142 and 144 and has a hand wheel 146 mounted on the end thereof that projects outwardly of the frame 120 beyond the bearing 144. A bevel gear 147 is mounted on the shaft 145 and meshes with bevel gears 148 and 149 that are respectively mounted on screws 150 and 151 which screws, as best shown in Fig. 12, respectively have the lead thereof extended in opposite directions. The screw 150 passes through a nut as 152 that is secured to the plate 127. The screw 151 passes through a nut similar to the nut 152 and is secured to the plate 128. The shaft 145 also carries a bevel gear 153 that meshes with bevel gears 154 and 155 respectively provided on screws 156 and 157 which are arranged similarly to the screws 150 and 151. The screws 156 and 157 respectively extend through nuts respectively secured to the plates 127 and 128.

When the handle wheel 146 is rotated, rotary movement is imparted to the shaft 145 and this is transmitted through the gears 149 and 153 to the bevel gears 148 and 149 and 154 and 155 and therefore to the screws 150 and 151 and 156 and 157. Rotation of these screws in the nuts through which they are passed causes the plates 126 and 127 to move along the rods 123 and 124 toward or away from each other, the direction of such movement being dependent upon the direction of the rotation of the handle wheel 146.

A support is provided for the upper ends of the arms 133 and 135 and to this end a shaft 158 is pinned or otherwise suitably secured to the arm 133 near the outer end thereof, a similar shaft 159 is being provided in similar location on arm 135. A link 160 is connected to one end of the shaft 158 and another link 161 is connected to one end of the shaft 159. As best shown in Fig. 10, the links 160 and 161 are screw-threaded near the ends thereof opposite those connected to shafts 158 and 159. This screw-threaded end portion of the link 160 is passed into a turnbuckle 162, another threaded link 163 also being extended into the turnbuckle 162. The free end of the link 163 is suitably secured to a cross brace 164 of the frame 120. By manipulating the turnbuckles as 162 the links as 160 may be caused to move in generally upward or generally downward direction for the purpose that will be described hereinafter.

A pulley 165 is mounted on the shaft 158 for rotation thereabout, and another pulley 166 is similarly mounted on the shaft 159. Another pulley 167 is mounted on an arm 168 that is carried by the plate 129. A similar arm 169 extends outwardly from the plate 131 and carries a pulley 170. Pulleys 165 and 167 are associated with the pulley 137, while pulleys 166 and 170 are associated with the pulley 140, these pulleys being engaged by an endless belt as will be described presently. A shaft 171 extends between the side plates 121 and 122 and affords a support for a cylinder 172. A pulley 173 is mounted on the plate 127 adjacent to one end of the cylinder 172. Another pulley 174 is mounted on the plate 128 adjacent to the other end of the cylinder 172.

Figure 13:
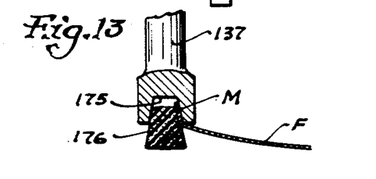
Fig. 13 is an enlarged detail view showing the manner in which an edge of the film is grasped during passage thereof through the apparatus illustrated in Figs. 10 to 12, inclusive.

As best shown in Fig. 13, the periphery of the pulley 137 has a substantially V-shaped groove 175 formed therein and into which an endless V-belt 176 may be extended. The endless V-belt 176 leads from the periphery of the pulley 137 to the pulley 165 and is passed about this pulley to thereby be extended to the pulley 167. The belt 176 passes about the pulley 167 and leads to the belt pulley 173 from whence the belt is extended about the cylinder 172 and thence to the groove in the pulley 137.

The pulley 140 also has a V-shaped groove formed in the periphery thereof to receive an endless V-belt 177 which passes from the pulley 140 and about the pulley 166 to thereafter be extended to and about the pulley 170. From the pulley 170 the belt 177 leads to the guide roller 174 and thereafter about the periphery of the cylinder 172 and then back to the pulley 140.

The belts 176 and 177 in cooperation with pulleys 137 and 140, respectively, are effective to impart the transverse or lateral stretching to the film as it is passed through the machine, as will be described in detail hereinafter. Inasmuch as the degree of transverse stretching to be imparted to the films will vary with the nature of the films, the adjustment comprising the handle wheel 146 and associated mechanisms has been provided and, as stated hereinabove, manipulation of the handle 146 causes the plates 126 and 127, and the parts carried including in the pulleys 137 and 140, to be moved toward or away from each other, dependent upon the direction of the rotation of the hand wheel 146. Further adjustment of the upper portions of the pulleys 137 and 140 in respect to each other may be effected by manipulation of the turnbuckles as 162 associated with links as 160 and 161.

It is usually advantageous to heat the film that is to be stretched in my novel apparatus and to this end I have provided a heated roller about which the film may be directed. Thus, a shaft 178, Figs. 10 and 12, extends between frame members 179 and 180 of the frame 120. This shaft supports discs as 181 about which the cylindrical sleeve 182 is disposed, this sleeve affording the roll about which the film is to be passed. In the present instance I support electrical heating units as 182 from the plates as 181 and these heating elements are distributed interiorly of the sleeve 183 in such a way as to insure uniform heat of the sleeve or roller 182.

A shaft 184 extends between the frame elements 179 and 180 and affords a support for the guide roller 185 that is mounted adjacent to the periphery of the roller 182 to be effective to direct the film to be stretched onto the heated roller 182. The film passes to the roller 185 from a pair of rollers 186 and 187 that are respectively supported by shafts 188 and 189 that extend between the frame elements 179 and 180. The film passes through the bight between the rollers 186 and 187 which serve as supply rolls, as will be described more fully hereinafter.

The frame elements 179 and 180 include uprights as 190, Fig. 10, which have notches as 191 formed in the upper edges thereof to receive shaft as 192 about which the film to be stretched is wound, and this affords a source of supply of film to be stretched. The film leads from the supply roll 193 past a guide rod 194 and thence about the periphery of the roller 187. The film then extends through the bight between the rollers 186 and 187 and beyond this bight is directed about the periphery of the roller 186 from which the film leads to the guide roller 185 and then to the heated roller 182.

It is advantageous to maintain prolonged contact of the film to be stretched with the periphery of the heated roller 182. To this end brackets as 195, Fig. 10, support arms as 196 which have springs as 197 connected thereto, these also being connected to the uprights as 190. At the ends of the arms 196 opposite those to which the springs 197 are secured, a roller as 198 is mounted and the springs as 197 are effective to urge such rollers 198 toward the periphery of the heated roller 182. The bight between the rollers 182 and 198 is such that the film F passes from this bight tangentially to the pulleys 137 and 140.

Once the material has been stretched it is wound up on a takeup roller as 199. This takeup roller is supported from the frame member 164, a plate 200 being a part of such support. On each side of the machine a bearing as 201 is fast to the cross member 164 and an adjustment screw as 202 passes through a tapped opening in the bearing 201. The screw as 202 is connected to the upper edge of the plate 200. Hence, by manipulating the screw 202 the plate 200 may be raised or lowered as desired. An adjustment of this character is provided at each end of the plate 200 which extends across the machine and thereby individual vertical adjustment for the respective ends of the takeup roller 199 is afforded.

The plate 200 carries an angle brace 203 which has arms as 204 hingedly connected thereto at opposite ends thereof and this brace, like the plate 200, extends across the machine. An adjustment screw as 205 passes through a tapped opening the the plate 204 and the inner end of this adjustment screw bears against the adjacent face of the plate 200. An adjustment screw as 205 is provided at each end of the cross brace 203 so that here again independent adjustment are afforded for opposite ends of the takeup roller 199, these adjustments being effected in a horizontal plane.

Figures 16, 17:
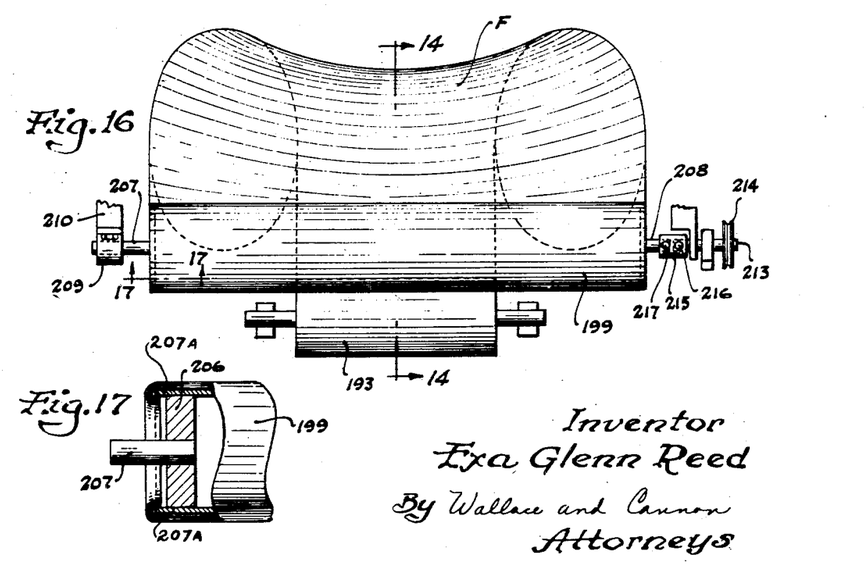
Fig. 16 is a partially diagrammatic plan view showing the film near the end of the continuous and progressive longitudinal and lateral stretching thereof and also showing the winding of the film onto the windup or takeup roller.
Fig. 17 is a fragmentary view partially in section of one end of the windup or takeup roller.

The take-up roller 199 includes a sleeve 207A as is best shown in Fig. 17. A disc 206 is mounted in this sleeve inwardly at one end thereof and affords a support for a shaft 207, a similar support for the shaft 208 being provided at the opposite end of the roller 199. Shaft 207 is slidably and rotatably mounted in a bearing 209 that is carried by a part 210 of the frame 120. Brackets as 211 and 212 depend from the plate 200 and afford a support for the shaft 213 which has a pulley 214 fast to the outer end thereof. The inner end of shaft 213 extends into a sleeve 215 and is connected thereto by a bolt 216. The shaft 208 is also extended into the sleeve 215 and is detachably connected thereto by the bolt 217. When the desired amount of stretched film has been wound on the take-up roller 199, it is removed from the machine. To effect this, bolt 217 to withdraw from engagement with the shaft 208 and thereupon the roller 199 may be moved toward the left, as viewed in Fig. 16, to withdraw shaft 208 from the sleeve 215. Once the shaft 208 has been cleared of the sleeve 215, the roller 199 is then moved to the right, as viewed in Fig. 16, until the shaft 207 is withdrawn from the bearing 209 and thereupon the take-up roller is released from the machine.

It is essential that various operating elements of my novel machine operate in timed relation one with the other and to this end, a motor 218 is provided and the various operative elements of my machine are driven from this motor. In Fig. 10 I have diagrammatically illustrated the drives of the various elements in the machine. Thus, a belt 219 passes about the pulley 220 on the shaft of the motor 218 and also about a pulley 221 fast on shaft 222. The shaft 222 has a variable speed pulley 223 attached thereto, the pulley being capable of manual adjustment for a purpose described presently. A belt 224 leads from the variable speed pulley 223 to a pulley 225 fast on the shaft 226, the shaft 226 constituting the main drive shaft of my machine. By adjusting the variable speed pulley 223, the main drive shaft 226 is caused to operate at a selected speed.

Driving movement is imparted to the cylinder 172 to thereby drive the belts 176 and 177 and the parts associated therewith. Thus, a belt 227 leads to the pulley on the main drive shaft 226 that is fast thereto adjacent to the pulley 225, and this belt passes about a pulley 228 fast on a shaft 229. A pulley 230 is also fast on a shaft 229 and the belt 231 is passed thereabout, this belt also passing about the pulley 232 that is connected to the cylinder 172. Hence, when the main drive shaft 226 is set in operation, movement is transmitted through the belts 227 and 231 to the cylinder 172 to thereby set in operation the belts 176 and 177 which are passed about this cylinder. It will be noted that no variable speed arrangement is afforded in association with the belts 227 and 231, since adjustment of the speed of the cylinder 172 is not desired, this serving as the standard to which the operation of other operative parts of my machine is related.

The supply rollers 186 and 187 and the heated roller 182 are driven in timed relation with the cylinder 172 and the belts 176 and 177, and to this end these rollers are driven by the drive for the cylinder 172. Thus, a belt 233 passes about a pulley fast to the cylinder 172 and also about a pulley 234 fast on the shaft 235. Another pulley 236 is fast on the shaft 235 and the belt 237 is passed thereabout, this belt also passing about the pulley 238 fast on the shaft 239. A manually adjustable variable speed pulley 240 is secured to the shaft 238 and the belt 241 is passed about this variable speed pulley and also about a pulley 242 fast on the shaft 243. Another pulley 244 is secured to the shaft 243 and the belt 245 is directed thereabout and also about a pulley 246 connected to the roller 186. By adjusting the variable speed pulley 240 the speed of operation of the roller 186 and therefore the roller 187 may be regulated relative to the speed of operation of the heated roller 182.

The drive for the heated roller 182 includes a belt 247 passed about a pulley fast on the shaft 235 adjacent to the pulley 236 and this belt also passes about a pulley 248 secured to the shaft 249. A manually adjustable variable speed pulley 250 is fast on the shaft 249 and a belt 251 passes thereabout and about a pulley 252 secured to the shaft 253. Another pulley 254 is fast on the shaft 253 and a belt 255 is passed thereabout, this belt also passing about the periphery of the heated roller 182. By adjusting the variable speed pulley 250 the speed of operation of the heated roller 182 may be adjusted.

It is necessary that the take-up roller 199 be driven in timed relation with the other operative parts of my machine. To this end a belt 256 is passed about a pulley fast on the main drive shaft 226 adjacent to the pulley 225, this belt also passing about a pulley 257 secured to the shaft 258. A manually adjustable variable speed pulley 259 is also fast on the shaft 258 and a belt 260 is passed about this variable speed pulley and a pulley 261 secured to the shaft 262. Another pulley 263 is fast on the shaft 262 and a belt 264 passes thereabout and about a pulley 265 secured to the shaft 266. Another pulley 267 is fast on the shaft 266 and a belt 268 is passed about the pulley 267 and about a pulley 269 secured to the shaft 270. Another pulley 271 is fast on the shaft 270 and a belt 272 passes about this pulley and also about a pulley 214 on the shaft 213 which, as explained hereinabove, is connected through the sleeve 215 to thereby impart driving movement to the take-up roller 199.

In addition to heating the film F by passing thereabout the heated roller 182, it may be advantageous to heat the film during the time it is subjected to the stretching action effected by pulleys 137 and 140 and the parts associated therewith. To this end one or more infrared heat lamps 273 may be suported from the frame 164 to be directed toward the film F as it passes about the pulleys 137 and 140.

When a film is to be stretched the various adjustments hereinabove described are manipulated to cause the various operative parts of the machine to operate in determined time relation one with the other. For example, when a rubber hydrochloride film, such as Pliofilm, is to be stretched, it is withdrawn from a supply of roll as 193 and is passed to rollers 187 and 186 and then about the roller 185. The film is then disposed on the periphery of the heated roller 182 and is maintained in prolonged contact there with the roller 193.

If desired, some longitudinal stretching may be imparted to the film F by the rollers 186 and 187 and the roller 182. To bring this about, the variable speed pulley 240 is adjusted to cause the rollers 186 and 187 to operate at a speed slightly slower than the speed of operation of the film F as it passes about the heated roller 182, the speed of operation of this roller being subject to the variable speed pulley 250.

From the heated roller 182 the film F is extended so that the opposite side marginal edges thereof respectively move into contact with the belts 176 and 177. The engagement of these side edges of the film with these belts causes one marginal portion M, Fig. 13, of the film to be clamped between the belt 176 and the wall of the groove 175 in the pulley 137, and it will be understood that a similar gripping of the other marginal portion is effected between the belt 177 and the pulley 140. The speed of operation of the cylinder 172 and therefore the belts 176 and 177 and the parts associated therewith is such that the film F passes about the pulleys 137 and 140 at a speed higher than the speed of the film as it passes about the heated roller 182 and thereby a longitudinal stretch is imparted to the film. A transverse stretch is also imparted to the film F as it passes about the pulleys 137 and 140 by reason of the diverging relation between these pulleys.

Figures 14, 15:
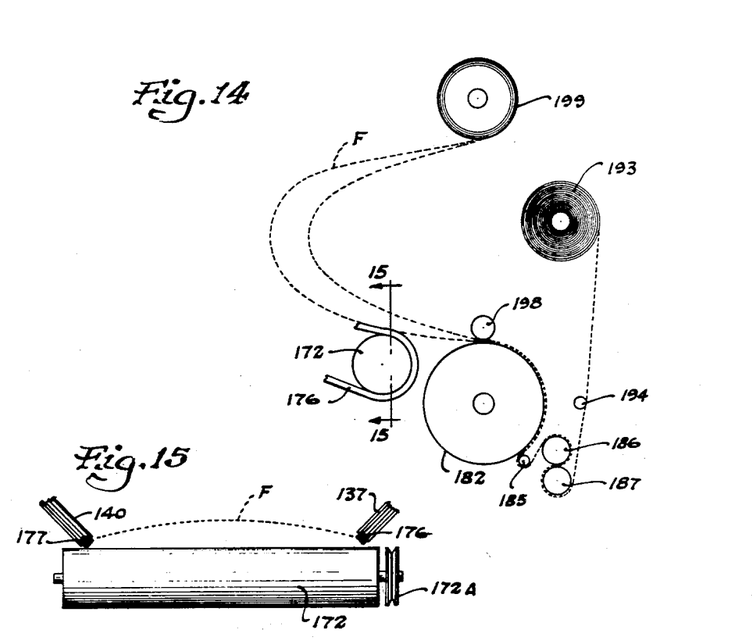
Fig. 14 is a diagrammatic view illustrating the path of travel of the film through my apparatus from the supply roll therefor to the windup or takeup roll therefor and which is taken substantially on the line 14—14 on Fig. 16.
Fig. 15 is a partially diagrammatic transverse sectional view illustrating the initiation of continuous and progressive longitudinal and lateral stretching of a film in my apparatus.

In order that proper stretching of the film as F will be effected, the speed of operation of cylinder 172, and therefore the belts 176 and 177, is so related to the speed of operation of the heated roller 182 that, as the film passes from the heated roller 182 to the pulleys 137 and 140, the film assumes a concavo-convex configuration such as that shown in Fig. 15, where it will be noted that the apex of the configuration is more remote from the periphery of the roller 172 than are the marginal portions of the film. By adjusting the speed of operation of the pulleys 137 and 140 to the heated roller 182, the degree of this concavo-convex configuration may be varied, and for each material, such as Pliofilm, or any other film, the degree of this concavo-convex configuration is determined empirically. The concavo-convex configuration increases in magnitude as the longitudinal stretching of the film between roller 182 and belts 186 and 187 is increased. It is the degree of stretch desired that is determined empirically so that the desired degree of stretch of the film is realized.

As best shown in Fig. 16, the film F also assumes a concavo-convex configuration as it passes about the pulleys 137 and 140 and as it extends to the take-up roller 199, the concavo-convex configuration of course being flattened when the film engages the take-up roller 199. The particular concavo-convex configuration imparted to the film F at this time is just as important as the concavo-convex configuration described hereinabove, and when a relatively thin film is being stretched, the concavo-convex comnfiguration of the film F between the pulleys 137 and 140 will be of a greater degree than the concavo-convex configuration that is imparted to the film F as it passes from the heated roller 182, as described hereinabove. However, when a relatively thick film is being stretched, then the degree of concavo-convex configuration of the film F between the pulleys 137 and 140 will be of a degree less than the concavo-convex configuration imparted to the film F as it leaves the heated roller 182.

As a further example of the operation of my machine, when a rubber hydrochloride film such as Pliofilm of a thickness of .0008 inch is to be stretched to have a thickness of .0001 inch after stretching, the speed of the take-up roll 199 is at least 100 feet per minute. Under these circumstances the cylinder 172 and the belts 176 and 177 and the pulleys 137 and 140 are caused to operate at a rate such that the film will travel approximately 75 feet per minute while the edges thereof are clamped by the belts 176 and 177 to the pulleys 137 and 140 respectively. Also under these circumstances the heated roller is operated at a rate such that the film passes therefrom at approximately 45 feet per minute. Under these circumstances the aforesaid film of Pliofilm will be progressively and continuously longitudinally and transversely stretched so that the area of stretched film will be about eight times the unstretched surface area. When a film of Pliofilm of a thickness of .0002 inch in thickness is to be stretched, then the speeds of operation will be appreciably slower than the speeds of operation set forth hereinabove.

With reference to the foregoing, however, it will be understood that if a film of a material other than Pliofilm is to be stretched, then, as explained hereinabove, the degree of the concavo-convex configurations described hereinabove are determined empirically so that satisfactory and porper stretching of the film is effected.

In order to insure that the film does not lose the stretch imparted thereto I so arrange the take-up roller 199 so that the end portions thereof are opened as illustrated in Fig. 17. With this arrangement, when the marginal edges as M of the film pass from engagement with the belts 176 and 177 and the pulleys 137 and 140 they curl into the adjacent end of the take-up roller as illustrated in Fig. 17. This has the effect of securing the film in its stretched condition. With respect to this it is usually desirable that the stretched film be retained on the take-up roller 199 for a period sufficient to enable the stretched condition to become permanent. The length of time the roll of stretched film will be stored will depend upon the nature of the film, but when the aforesaid film of Pliofilm of .0008 inch thickness is stretched as described hereinabove, it is sufficient that the film be maintained in its wound up condition for a period of approximately twenty-four hours, for by this time the stretch imparted to the film will have become permanent.

Inasmuch as the diameter of the take-up roller will increase as the stretching operation progresses, it is necessary in the course of operation of the machine to vary the distance between the take-up roller and the point where the film passes from contact with the belts 176 and 177. Thus as the roll of stretched film increases in diameter, the adjustment screws as 202 are manipulated to raise the plate 200 and the parts associated therewith. In some circumstances it may be advantageous to also effect the adjustment that may be brought about by manipulation of the screws as 205.

As the film is wound up on the take-up roller 199 with the end portions thereof curling into the ends of the roll, the length of the roll increases at each end. Therefore, from time to time, the adjustments including the turnbuckles as 162 are manipulated to move the outer edges of the pulleys 137 and 140 outwardly away from each other so to insure that the edges of the film pass from the belts 176 and 177 to the take-up roll along practically straight paths.

In some instances it may be advantageous to simultaneously pass two or more films through my machine concurrently so as to thereby simultaneously stretch each of such films longitudinally and transversely. Among the instances where this will be desirable is the circumstance where a relatively strong film, such as a rubber hydrochloride film, is passed through the machine concurrently with a relatively weak polyethylene film. In such instances the rubber hydrochloride film affords a reinforcement for the weaker polyethylene film and usually when two such films are passed concurrently through my machine, they are not laminated together during passage thereof through the machine, as will be explained more fully hereinafter.

Another instance where it may be advantageous to pass two films through my machine simultaneously is an instance where it is desired to produce a non-porous film. In such instances two similar films will be passed through the machine simultaneously and here such films will usually be laminated together as an incident to the simultaneous longitudinal and transverse stretch thereof.

Sometimes as many as three films or even more may be passed through my machine concurrently to be subjected to simultaneous lateral and longitudinal stretching. This is usually done in those circumstances where a film of relatively high strength is employed as the support or inner film and the outer films are selected and are laminated to the supporting film because their chemical or physical properties are desirable in the use to which the stretched and laminated film is to be put. Thus, a relatively inert stretched film is used for the packaging of foods. Also in some instances where the films are to be placed in contact with metal, the face of the film to contact the metal will be one embodying rust-inhibiting properties.

Figure 18:
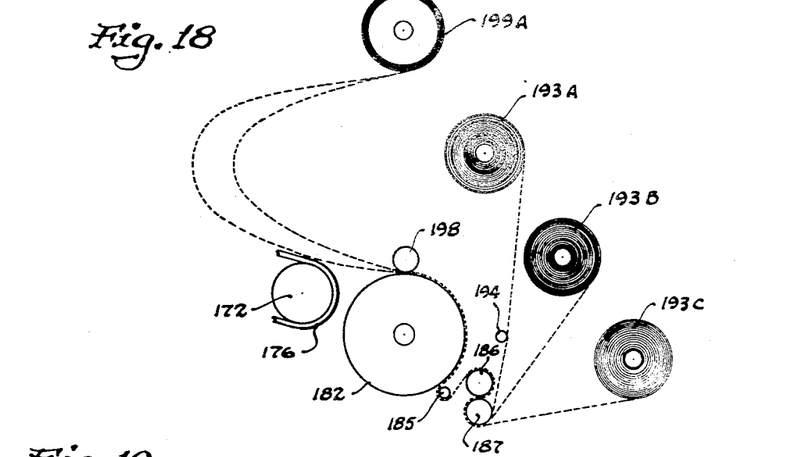
Fig. 18 is a view similar to Fig. 14 and showing the manner in which a plurality of films may be passed through the novel machine of this invention.

In Fig. 18, I have diagrammatically illustrated the manner in which three films may be passed through my machine concurrently. In the instance illustrated in Fig. 18, the central or reinforcing film is withdrawn from a supply roll 193B and, by way of example, this may be a Pliofilm or other rubber hydrochloride film. In such circumstances and also by way of example, the film to be withdrawn from the supply roll 193A may be a polyethylene film, and further in such circumstances, the film withdrawn from a supply roll 193C may be a polyvinyl-alcohol film. When three such films are passed through my machine concurrently, it is advantageous to laminate the outer films to the central films and this is effected as an incident to the simultaneous transverse and longitudinal stretching of the film, particularly by reason of the concavo-convex configurations the film assumes during the stretching operations.

The laminating effect that is realized as an incidence to the simultaneous longitudinal and transverse stretching of the films accrues by reason of the arcuate path travelled by the film in the extent thereof intermediate the heated roller 182 and the take-up roller 199 and, particularly, by reason of the arcuate path assumed by the film in passing about the pulleys 137 and 140 when secured thereto by the action of the belts 176 and 177, respectively. In such circumstances, by reason of the arcuate path that is followed, what will be the innermost film, when the laminated films are wound on the take-up roller 199A which corresponds to the take-up roller 199, will be stretched to a slightly greater extent than will be what will be the central and outermost films when the laminated films are wound in the take-up roller 199A. This causes the films to be pressed together and this effect is augmented by reason of the concavo-convex configuration assumed by the film during the simultaneous longitudinal and transverse stretching thereof, this also having the effect of imparting different radii to the films. Hence, when one or more films are simultaneously passed through my machine, the film which will afford the innermost film when the laminated films are wound on the take-up roller will be effective to exert pressure toward the other film or films and this will bring about the desired lamination of the films.

The laminating effect just described is augmented by reason of the fact that the surface characteristics of the films are undergoing alteration is an incident to the simultaneous longitudinal and transverse stretching thereof. This disturbance, which is probably molecular in nature, is such that the adjacent faces of the films appear to have a tendency to weld one to the other and, as stated, this enhances the lamination of the films to the other.

The surface characteristics of the films are altered not only by reason of simultaneous longitudinal and transverse stretching of the films but also because the films are heated in the course of passage thereof about the heated roller 182, which has the effect to softening the films and, as explained, this softening effect may be enhanced by resort to one or more infra-red heat lamps as 273 placed to supply heat to the film as it is passed about the pulleys 137 and 140.

The heated roller 182 is operated at a temperature which will be effective to heat the film passing to the softening temperature thereof. In order that the temperature of the roller 182 may be varied, each heating element 183 has an independent circuit that embodies either an automatic or manually operated switch so that each element may be operated independently of the other and this enables the temperature of roller 182 to be controlled. When the circuit for a heating element embodies an automatic switch, then a temperature responsive means is associated with the heating element and such means effective operation of the automatic switch.

The infra-red lamps as 273 not only have the hereinabove described effect of tending to soften the films during lamination thereof but also have an effect upon the gauge of the film as a result of the simultaneous longitudinal and transverse stretching thereof. Resort is had to such lamps even when a single film is being passed through the machine, especially in those circumstances where a material reduction in the gauge of the film is desired as an incident to the stretching thereof.

In those instances where films are to be passed through my machine and lamination thereof is not desired, then the film which is to afford the outer film when the films are wound on the take-up roller 199A, must be of a material softer than the material of the film that will be innermost during winding on the take-up roller 199A. Then, by reason of the fact that the innermost film will be travelling on a longer path during movement thereof about the pulleys 137 and 140 and also by reason of the fact that what will be the outermost film is softer, the two films assume different concavo-convex configurations, both in the portion thereof leading from the heated roller 182 to the clamping effect of the belts 176 and 177 and also in the portion of the film where the film is undergoing and leaving the clamping effect of belts 176 and 177. This difference in concavo-convex configurations will be such that what will be the outermost films when the films are wound on the take-up roller 199A, assumes a greater concavo-convex configuration than does what will be the innermost of the films when wound on the take-up roller 199A, so that, in effect, in such circumstances there will be a tendency of the films to pull apart rather than to laminate. By reason of this the films may be passed through my machine without being laminated. In circumstances such as this, it will be understood that what will be the innermost film when the films are wound on the take-up roller 199A is not only harder than what will be the outermost film but it is also stronger and therefore it affords a support for the weaker film as it passes through the machine. This is particularly important with respect to a weak film which would have a tendency to split. This supporting effect is realized even though there is a tendency of the films to pull apart, as explained hereinabove and, as stated above, resort is had to such an arrangement where the stretching of a relatively weak film is to be effected.

Figures 19, 20, 21:
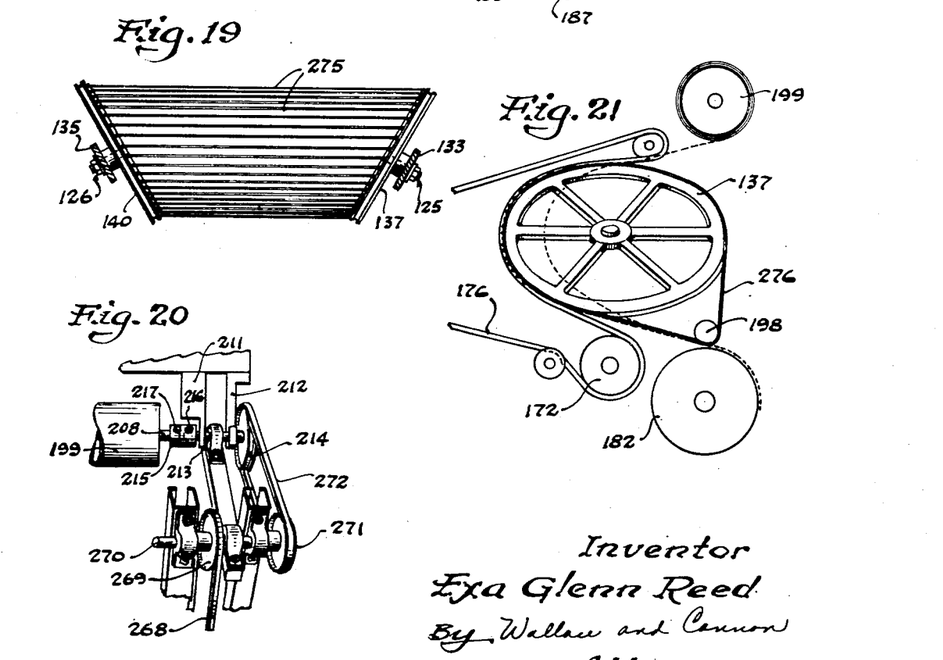
Fig. 19 is a vertical sectional view illustrating a modified form of my invention.
Fig. 20 is an elevational view of a portion of the driving means of my novel machine.
Fig. 21 is a fragmentary view similar to Fig. 10 and showing a further modified form of my invention.

Still another way in which the stretching of a relatively weak film may be effected is illustrated in Fig. 19. By referring thereto it will be seen that a plurality of rubber bands 275 have the ends thereof respectively connected to the pulleys 137 and 140 so that these rubber bands extend between the pulleys as does the film to be stretched, as explained hereinabove. These rubber bands are subjected to the same forces as is the film during passage thereof through the machine and consequently these rubber bands are stretched along their length as a result of the forces imparting transverse stretch to the film during passage thereof about the pulleys 137 and 140. The rubber bands of course will be stretched to a much greater degree in the upper and outermost portions of the pulleys 137 and 140, for it is these portions of the pulleys that are disposed most remote from each other. This stretching renders the rubber bands taut and they engage the underside of the film during passage thereof about the pulleys 137 and 140 and afford a support therefor which is effective to prevent tearing of the film during the simultaneous longitudinal and transverse stretching thereof.

Still another way in which a relatively weak film may be supported during the simultaneous longitudinal and transverse stretching thereof is illustrated in Fig. 21. Here an endless relatively wide rubber belt 276 is disposed to extend around the pulleys 137 and 140 in such a way that the edges thereof may be clamped to the pulleys by the belts 176 and 177 in the same way in which the marginal edges of the film are clamped as described hereinabove. This endless belt is also of such a length that it may be passed under and about the clamping roller 198. This rubber belt will be subjected to the same forces as is the film during the simultaneous longitudinal and transverse stretching thereof and will therefore in the portions thereof clamped by the belts 176 and 177 assume a concavo-convex configuration like that assumed by the film. Hence the rubber belt, like the aforesaid rubber bands, affords continuous support for the film as it is being subjected to the simultaneous longitudinal and transverse stretching, and this support is effective to prevent tearing of the film during the stretching operation. Of course, as the belt 276 passes from the clamping effect of the belts 176 and 177 then, by reason of the elasticity thereof, it assumes relatively flat condition, particularly in the passes thereof adjacent to the pressure roller 198.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A film stretching apparatus embodying a heating surface over which the film may be passed, means for advancing the film at a certain speed to said surface, means to which film is passed from said heating surface and including a pair of film stretching means arranged to move along respective arcuate paths in diverging relation with each other and having certain portions thereof spaced apart more than other portions thereof, clamping means passed about each of said film stretching means and respectively being effective to initially clamp opposite marginal portions of said film to the diverging peripheries of the stretching means at the said other portions thereof and also being effective to retain the marginal portions of the film in continuous engagement with the film stretching means along a continuous line from the said other portions of the stretching means to the said certain portions thereof to thereby laterally stretch the film continuously along an outwardly diverging arcuate path, and means operating said stretching means at a speed greater than said certain speed whereby said film has a longitudinal stretch imparted thereto.

2. A film stretching apparatus embodying a heating means to which the film is passed to render the film plastic and stretchable, means to which the film is passed from said heating means and including a pair of rotatable wheels arranged in opposite but diverging relation with respect to each other and having certain portions thereof spaced apart more than other portions thereof, a friction belt passed about a portion of the periphery of each of said wheels between said portions thereof, said belts respectively being effective to initially clamp opposite marginal portions of said film to the wheels at the said other portions thereof and also being effective to retain the marginal portions in continuous engagement with the wheels from the said other portions of the wheels to the said certain portions thereof to thereby laterally stretch the film continuously along an outwardly diverging arcuate path, means for winding up the stretched film after the marginal portions are freed from the belts, and means for operating said heating means, wheels and windup means in predetermined timed relation one with the other to also impart a longitudinal stretch to the film.

3. A film stretching apparatus embodying a heating means to which the film is passed to render the film plastic, means to which the film is passed from said heating means and including a pair of rotatable circular film stretching means arranged to move along arcuate paths in opposite but diverging relation with respect to each other so that certain portions thereof are spaced apart more than other portions thereof, means cooperating with the stretching means for applying continuous holding forces to the marginal edges of said film to cause the edges of the film to follow the diverging path of said stretching means whereby the film may be laterally stretched along a diverging arcuate path, means for imparting continuous rotary movement to the film stretching means and effective to pass the film to the heating means at a rate slower than that of the said film stretching means whereby a longitudinal stretch is imparted to the film, and means to impart a preliminary lateral stretch to the film while the film is advancing between the heating means and the first-named film stretching means.

4. A film stretching apparatus embodying a heated roller over which the film may be passed, means to which said film is passed from said heated roller and including a pair of rotatable wheels arranged in opposite but diverging relation with each other and having certain portions thereof spaced apart more than other portions thereof, a belt passed about each of said wheels, said belts respectively being effective to initially clamp opposite marginal portions of film to the wheels at the portions thereof which are closest together and also being effective to retain such marginal portions of the film in engagement with the wheels continuously from the portions where the wheels are closest together to the portions where the wheels are most widely spaced apart to thereby laterally stretch the film along a diverging arcuate path, means for winding up the stretched film after the said marginal portions thereof are freed from the wheels, means for imparting continuous rotary movement to the heated roller, wheels and windup means and effective to rotate the heated roller at a rate slower than that of the wheels and also effective to operate the windup means at a rate faster than that of the wheels whereby said film also has a longitudinal stretch imparted thereto thereby assuming a concavo-convex configuration, and means to impart a preliminary lateral stretch to the film as it moves between said heated roller and said wheels whereby the film is stretched both laterally and longitudinally at the same time.

5. A film stretching apparatus embodying feed means for feeding the film, means to which the film is passed from said feed means and including a pair of rotatable wheels arranged on an axis so as to be disposed in opposite but diverging relation with respect to each other and having certain portions thereof on one side of the axis spaced apart more than other portions on the other side of the axis, a belt passed about each of said wheels, said belts respectively being effective to initially clamp opposite marginal portions of film to the wheels at the second-named side of the axis and also being effective to retain the marginal portions continuously in engagement with the wheels from the said other side of the axis to the said one side of the axis to thereby laterally stretch the film continuously along an arcuate diverging path, means for winding up the stretched film after the marginal portions are freed from the belts, and means for imparting continuous rotary movement to the feed means, wheels and windup means and effective to rotate the feed means at a rate slower than that of the wheels and also effective to operate the windup means at a rate faster than that of the wheels.

6. A film stretching apparatus embodying means for feeding the film, means to which the film is passed from said feeding means and including a pair of oppositely disposed film stretching means arranged to move simultaneously along respective arcuate paths in opposite but diverging relation with respect to each other so that certain portions thereof are spaced apart more than other portions thereof, means cooperating with said stretching means to cause the edges of the film to follow the diverging path of said stretching means along continuous lines whereby the film may be laterally stretched between the portions that are spaced apart as aforesaid, means for winding up the stretched film after the edges thereof have been thus laterally stretched, and means for imparting continuous feeding movement to the feeding means, the film stretching means and the windup means and effective to rotate the feeding means at a rate slower than that of the film stretching means and also effective to operate the windup means at a rate faster than that of the wheels.

References Cited in the file of this patent

UNITED STATES PATENTS

| Number | Name | Date |
|---|---|---|
| 1,238,742 | Butler | Sept. 4, 1917 |
| 2,307,817 | Austin | Jan. 12, 1943 |
| 2,334,022 | Minich | Nov. 9, 1943 |
| 2,335,190 | Minich | Nov. 23, 1943 |
| 2,412,187 | Wiley et al. | Dec. 3, 1946 |
| 2,452,999 | Daly et al. | Nov. 2, 1948 |
| 2,468,697 | Wiley | Apr. 26, 1949 |
| 2,483,339 | Gardner et al. | Sept. 27, 1949 |
| 2,490,781 | Cloud | Dec. 13, 1949 |
| 2,505,146 | Ryan | Apr. 25, 1950 |
| 2,559,365 | Middleton et al. | July 3, 1951 |
| 2,559,705 | Borkland | July 10, 1951 |